Patented Apr. 25, 1950

2,505,148

UNITED STATES PATENT OFFICE 2,505,148

DRYING OILS AND PROCESS OF MAKING SAME FROM CLAY TOWER POLYMERS

Valerie Schneider, Lubbock, Tex., assignor to Phillips Petroleum Company, a corporation of Delaware No Drawing. Application July 19, 1946, Serial No. 684,797

10 Claims. (Cl. 196—14.26)

This invention relates to improved drying oils and to processes for their production from viscous residues formed in processes for clay treating vapors of petroleum products during gasoline manufacture.

In the Gray process of clay treating petroleum products, vapors of cracked distillate or other material to be treated are passed through towers packed with suitable clay. The passage of the vapors through beds of clay under suitable conditions of heat and pressure results in the removal of most of the olefin, diolefin, and other gum forming impurities from the vapors by polymerization. The resulting polymers collect in the bottom of such towers in the form of a liquid containing a large proportion of hydrocarbons boiling in the gasoline range. This liquid is known as "original polymer" in ordinary refinery parlance.

In common refinery practice this original polymer liquid is subjected to distillation to recover substances boiling in the gasoline range therefrom. Distillation is usually continued until the residue becomes viscous and thick. The resulting viscous material is commonly known as "reduced polymer" and is usually a waste product although attempts have been made to utilize the reduced polymer in various applications. Both "original polymer" and "reduced polymer" have some of the characteristics of a drying oil since both materials air-dry to form films when spread on the surface of solid objects. This property has suggested the use of these materials in the field of coatings.

However, coatings in which these polymeric materials are used as film forming agents tend to chalk or deteriorate to dust when exposed to air and sunlight for two or three days. Such coatings also exhibit strong tendencies to check or crack so as to present an unsightly appearance and lessen the protection afforded the object coated. Such shortcomings are so serious that they practically preclude the use of clay tower polymers in coatings.

It is an object of this invention to provide improved drying oils.

Another object is to provide cheap drying oils derived from "reduced polymer" obtained from polymer liquid accumulated during a process of passing vapors of petroleum products through beds of clay in suitable towers.

Another object is to provide a method for preparing drying oils from clay tower polymers.

Another object is to provide a method for preparing drying oil from "reduced polymer" that is simple, easy and convenient in operation.

Other objects and advantages will become apparent to those skilled in the art as this disclosure proceeds.

I have found that "reduced polymer" can be separated by use of a selective solvent, into two fractions, namely a fraction rich in naphthenes and a fraction rich in naphthalene and substituted naphthalenes. Use of a selective solvent may often be advantageously combined with a process for crystallizing naphthalenes.

I have found that naphthene rich fractions after separation from solvents used for their extraction are improved drying oils.

The polymeric material which I prefer to use is "reduced polymer" obtained from clay tower treatment in the manufacture of gasoline from which substances boiling below about 400° F. have been removed by distillation. The properties of such "reduced polymer" usually fall within the ranges indicated in the following table:

| | |
|---|---|
| Initial boiling point, °F | 400–500 |
| A. P. I. gravity, 60° F | 13–17 |
| Specific gravity, 60°/60° F | 0.98–0.95 |
| Iodine No., gms. I₂/100 gms. oil | 200 |
| Non-volatile residue, per cent | 60–90 |

In order to separate reduced polymer into naphthene-rich and naphthalene and substituted naphthalenes-rich fractions, I may add a low-boiling paraffin or mixture of paraffins, such as liquid propane, butanes and/or pentanes, with which the polymer is miscible. Proportions employed are such that reduced polymer forms from 25 to 50 per cent of the resulting mixture. The mixture is then cooled to a temperature in the range from −112° F. to 32° F. Solid material rich in naphthalenes separates from the solution as a result of cooling while a fraction of reduced polymer, rich in naphthenes remains in solution. Solid material is filtered off and the naphthene rich fraction is recovered by distilling off low-boiling solvent.

Instead of the process described above I may employ extraction with a solvent which has greater solvency for naphthalenes than for naphthenes. Acetone, aniline, furfural, phenol and 2,2'-dichlorethyl ether are such solvents. When operating with such solvents I prefer to employ successive extractions with quantities of solvent approximately equal to the quantity of reduced polymer to be treated, but considerable deviation from such quantities may be used. I prefer to make such extractions with acetone, aniline, furfural, phenol or 2,2'-dichlorethyl ether by extracting reduced polymer with successive approximately equal volumes of solvent at a temperature in the range from about 22° to 40° F. and to continue such successive extractions until from 10 to 30 per cent of the reduced polymer has dissolved. Practically all naphthalenes are extracted by such treatment. Convenience, low operating cost and ease of control are obtained by such conditions of extraction. However, it is quite possible, and under some conditions may be desirable to operate with other proportions of solvent and at other temperatures. The boiling point and freezing point of the solvent used are the factors limiting possible temperature ranges of extraction. Quantities of solvent should be proportioned that successive extractions will dissolve not less than 10 per cent nor more than 30 per cent of the reduced polymer because good naphthalene separation is usually not obtained with less than 10 per cent solution of polymer and extraction of more than 30 per cent of polymer results in loss of material without corresponding increase in quality of residue.

In any case the residue is a naphthene-rich fraction and is recovered by distilling off the solvent.

Coatings produced from such naphthene-rich fractions of reduced polymer no longer check, nor do they show a tendency to chalk within a period of several months. The improvement in these coatings is such that these cheap, improved film forming materials may be considered competitive with other well-known film forming materials on the market. A significant difference between the naphthene-rich fraction separated by the process of my invention and the "reduced polymer" is found in the iodine number, which is increased to about 250. Such naphthene-rich fractions have a drying time about one-half as long as that for boiled linseed oil.

*Example I*

To 50 parts of "reduced polymer" 50 parts of isobutane were added and the mixture was cooled, with stirring, to −5° F. by immersing the container in chilled brine. A crystalline material separated and was removed by filtration. The crystalline material recovered amounted to 2½ per cent by weight of the "reduced polymer" and was principally made up of naphthalene and substituted naphthalenes. After filtration, the clear filtrate was subjected to distillation until a boiling point of 200° F. was reached. The isobutane distillate was recovered. The kettle product was rich in naphthenes and was found to be an improved drying oil.

*Example II*

Eighty parts by weight of propane was "dissolved" at a pressure of 50 pounds per square inch gauge in 20 parts of "reduced polymer" at a temperature of 10° F. The resulting mixture was cooled with stirring and evaporation of a part of the propane to a temperature of −12° F. Crystalline material amounting to 3 per cent of the weight of "reduced polymer" separated out and was removed by filtration and contained a high percentage of naphthalene and substituted naphthalenes. The resulting clear filtrate was distilled and a propane distillate was recovered. The still residue was rich in naphthenes and was found to be an improved drying oil.

*Example III*

To 25 parts of "reduced polymer" was added 75 parts of isopentane and the mixture was cooled, with stirring, by immersing the container in a bath of solid carbon dioxide in acetone. Crystals amounting to 4 per cent of the weight of reduced polymer separated and were filtered off. The resulting clear filtrate was distilled and the pentane was recovered as distillate. The kettle residue was a naphthene-rich drying oil having an iodine number of 250 and when spread on window glass had a drying time about one-half as long as that of boiled linseed oil under the same conditions.

*Example IV*

Five hundred grams of "reduced polymer" was shaken with three successive portions of aniline of 500 cc. each at a temperature of 32° F. The resultant mixture was allowed to separate into layers after each agitation and the aniline layer was removed by decantation. After the third extraction and decantation residual aniline was extracted with dilute sulfuric acid. Four hundred twenty-two grams of naphthene-rich material remained and was found to have improved drying characteristics. The material extracted by aniline was found to contain a high proportion of naphthalene and substituted naphthalenes.

*Example V*

Five hundred grams of "reduced polymer" was shaken with three successive portions of acetone, of 500 cc. each, at 32° F. The resulting mixture was allowed to separate into acetone and polymer layers after each agitation and the acetone layer was removed by decantation. After the third decantation residual acetone was removed by distillation. The residue consisted of 375 grams of drying oil, rich in naphthenes.

The term "naphthene-rich" as used in this specification means containing a higher proportion of naphthenes and substituted naphthenes than the proportion of such materials normally present in "reduced polymer."

Having described my invention and explained its operation, I claim:

1. The process of producing a drying oil which comprises: distilling polymer liquid formed in a clay tower process for treating vapors of a petroleum fraction in the manufacture of gasoline; removing substantially all substances boiling below 400° F. from said polymer liquid as an overhead product; and separating the kettle product resulting from such distillation into a naphthalene-rich fraction and a naphthene-rich fraction suitable for use as a drying oil by use of a selective solvent at a temperature in the range from 22° to 40° F.

2. The process of producing a drying oil which comprises: distilling polymer liquid formed in a clay tower process for treating vapors of a petroleum fraction in the manufacture of gasoline; removing substantially all substances boiling below 400° F. from said polymer liquid as an overhead product; and separating the kettle product resulting from such distillation into a naphthalene-rich fraction and a naphthene-rich fraction suitable for use as a drying oil by use of a selective solvent.

3. The process of producing a drying oil which comprises: distilling polymer liquid formed in a clay tower process for treating vapors of a petroleum fraction in the manufacture of gasoline; removing substantially all substances boiling below 400° F. from said polymer liquid as an overhead product; and separating the kettle product resulting from such distillation into a naphthalene-rich fraction and a naphthene-rich fraction suitable for use as a drying oil by use of a selective solvent comprising a low-boiling paraffin at a temperature in the range from −112° F. to 32° F.

4. The process of producing a drying oil which comprises: distilling polymer liquid formed in a clay tower process for treating vapors of a petroleum fraction in the manufacture of gasoline; removing substantially all substances boiling below 400° F. from said polymer liquid as an overhead product; and separating the kettle product resulting from such distillation into a naphthalene-rich fraction and a naphthene-rich fraction suitable for use as a drying oil by use of a selective solvent comprising a low-boiling paraffin.

5. The process of producing a drying oil which comprises: distilling polymer liquid formed in a clay tower process for treating vapors of a petroleum fraction in the manufacture of gasoline; removing substantially all substances boiling below 400° F. from said polymer liquid as an overhead product; and separating the kettle product resulting from such distillation into a naphthalene-rich fraction and a naphthene-rich fraction suitable for use as a drying oil by use of a liquid selective solvent selected from the group consisting of aniline, acetone, furfural, phenol and 2,2'-dichloroethyl ether in amount sufficient to dissolve 10 to 30 per cent of said polymer liquid.

6. The process of producing a drying oil which comprises: distilling polymer liquid formed in a clay tower process for treating vapors of a petroleum fraction in the manufacture of gasoline; removing substantially all substances boiling below 400° F. from said polymer liquid as an overhead product; and separating the kettle product resulting from such distillation into a naphthalene-rich fraction and a naphthene-rich fraction suitable for use as a drying oil by use of successive portions of a selective solvent selected from the group consisting of aniline, acetone, furfural, phenol and 2,2'-dichloroethyl ether in the temperature range from 22° F. to 40° F.

7. An improved drying oil consisting of the naphthene-rich fraction of clay tower polymer liquid produced in the clay tower treatment of petroleum vapors, said liquid being substantially free from substances boiling below 400° F., substantially free from naphthalenes, and having an iodine number of approximately 250.

8. The process of producing a drying oil from clay tower polymer produced in the clay tower treatment of petroleum vapors which have been made substantially free of substances boiling below 400° F. which comprises the steps of extracting a naphthene-rich fraction from said polymer by dissolving said fraction in a solvent selected from the group consisting of low-boiling paraffins, aniline, acetone, furfural, phenol, and 2,2'-dichloroethyl ether, cooling the solution to precipitate the naphthalene type constituents, removing the solid material, and separating the solvent from the solute.

9. The process of producing a drying oil from clay tower polymer produced in the clay tower treatment of petroleum vapors which have been made substantially free of substances boiling below 400° F. which comprises the steps of extracting a naphthene-rich fraction from said polymer by dissolving said fraction in a solvent selected from the group consisting of low-boiling paraffins, aniline, acetone, furfural, phenol, and 2,2'-dichloroethyl ether, cooling the solution to a temperature between −112° F. and 40° F. to precipitate the naphthalene type constituents, removing the solid material, and separating the solvent from the solute.

10. The process of producing a drying oil from clay tower polymer produced in the clay tower treatment of petroleum vapors which polymer has been made substantially free of substances boiling below 400° F. which comprises the steps of dissolving the polymer in a low boiling liquid paraffin, cooling the solution to precipitate naphthalene type constituents, separating the liquid phase therefrom and removing the solvent from the solute.

VALERIE SCHNEIDER.

REFERENCES CITED

The following references are of record in the file of this patent:

UNITED STATES PATENTS

| Number | Name | Date |
|---|---|---|
| 1,919,722 | Hyman | July 25, 1933 |
| 2,024,106 | Levin | Dec. 10, 1935 |
| 2,035,455 | Bjerregard | Mar. 31, 1936 |
| 2,040,057 | Manley et al. | May 5, 1936 |
| 2,114,796 | Crawley | Apr. 19, 1938 |

OTHER REFERENCES

"Chemical Technology of Petroleum," 2nd edition, page 336, by Gruse and Stevens, pub. 1942 by McGraw-Hill Book Co., New York, N. Y.